US008342361B2

(12) United States Patent
Cooper et al.

(10) Patent No.: US 8,342,361 B2
(45) Date of Patent: Jan. 1, 2013

(54) MODULAR VENDING MACHINE FOR PACKAGED GOODS

(76) Inventors: Dan Alan Cooper, Lamesa, TX (US); Melvin Lewis Eaker, Lubbock, TX (US)

(*) Notice: Subject to any disclaimer, the term of this patent is extended or adjusted under 35 U.S.C. 154(b) by 0 days.

(21) Appl. No.: 12/894,023

(22) Filed: Sep. 29, 2010

(65) Prior Publication Data

US 2011/0106301 A1 May 5, 2011

Related U.S. Application Data

(63) Continuation of application No. 11/866,982, filed on Oct. 3, 2007, now abandoned.

(51) Int. Cl.
*G07F 11/12* (2006.01)
*B65H 3/06* (2006.01)
*G06F 17/00* (2006.01)

(52) U.S. Cl. ........ 221/105; 221/104; 221/103; 221/209; 221/133; 221/11; 221/295; 221/194; 221/285; 221/153; 700/243

(58) Field of Classification Search .................. 221/104, 221/121, 106, 105, 130, 122, 188, 209, 295, 221/151–153, 194, 133, 107, 111, 174, 178–181, 221/176, 189, 190, 285, 11, 10, 186; 700/242–243
See application file for complete search history.

(56) References Cited

U.S. PATENT DOCUMENTS

| | | | | |
|---|---|---|---|---|
| 2,353,496 | A * | 7/1944 | Pease | 221/105 |
| 3,613,946 | A * | 10/1971 | Klem | 221/109 |
| 4,576,272 | A * | 3/1986 | Morgan et al. | 194/215 |
| 4,729,480 | A * | 3/1988 | Groover et al. | 211/59.2 |
| 6,199,720 | B1 * | 3/2001 | Rudick et al. | 221/6 |
| 6,234,345 | B1 * | 5/2001 | Minh et al. | 221/124 |
| 6,247,610 | B1 * | 6/2001 | Ziesel et al. | 221/171 |
| 6,352,174 | B1 * | 3/2002 | Bauman et al. | 221/109 |
| 6,502,408 | B1 * | 1/2003 | Corcoran | 62/63 |
| 6,513,677 | B1 * | 2/2003 | Sorensen et al. | 221/130 |

* cited by examiner

*Primary Examiner* — Michael K Collins
(74) *Attorney, Agent, or Firm* — Nicholas A. Taylor

(57) ABSTRACT

The Novel Modular Vending Machine for Packaged Goods allows consumers to purchase packaged goods without an attendant present. The invention uses two or more conveyor assemblies to store and transfer packaged goods and primarily uses gravity to transfer the packaged goods from the storage location to the customer. When a vend is initiated, a dispensing drum rotates and places a packaged item on a delivery system for transportation to the customer. The remaining packaged goods move into position for the next vend. When the lower conveyor assembly is empty, an upper conveyor assembly is lowered into position to transfer the remaining packaged goods to the dispensing drum. The apparatus may be configured in a system comprised of multiple modular units controlled by a single user interface.

8 Claims, 14 Drawing Sheets

MODULAR VENDING MACHINE FOR PACKAGED GOODS

CROSS-REFERENCE TO RELATED APPLICATION

This application is a continuation application of Ser. No. 11/866,982 filed Oct. 3, 2007 now abandoned.

FIELD OF THE INVENTION

This invention relates to vending machines used for vending packaged merchandise such as food items, beverages, or other consumable products. More particularly, this invention relates to a vending machine module containing a system of conveyors that store and deliver packaged goods by the use of gravity, rollers, and mechanical means.

BACKGROUND

A variety of vending machines are available that allow consumers to purchase goods. Many of these vending machines are designed to deliver individual products for immediate or near term consumption by a purchaser. Vending machines that provide the opportunity for a consumer to purchase packaged products are less readily available. For example, it is common for consumers to encounter a vending machine that sells individual soft drinks but it is less common for consumers to encounter a vending machine that sells a twelve pack of soft drinks. As a result, many consumers who want to purchase a twelve-pack of soft drinks do so at a grocery store, convenience store, or other similar retail establishment. This process requires entering the establishment, locating the desired item, transporting the item to a point of sale terminal, purchasing the item, and exiting the establishment. Vending machines that sell packaged goods which are routinely consumed by customers would benefit both consumers and manufacturers; however, vending machines that sell packaged goods generally face greater design challenges than vending machines that sell individual items. For example, packaged goods are larger and heavier than individual items. Accordingly, a vending machine for packaged goods might be bulkier and require heavier components than a vending machine that sells individual items. In order for a vending machine for packaged goods to be economically feasible, it is desirable that the size, weight, and configuration of the components be engineered to accommodate the larger and heavier packaged goods in a cost-effective and reliable manner. To that end, it is desirable to utilize gravitational forces where possible to reduce the mechanical forces required to transfer the packaged goods from the storage location to the purchaser.

It is also desirable that vending machines which sell packaged goods be easy to reload due to the increased size and weight of the goods sold. A vending machine for packaged goods should be easy to reload so that individuals can do so quickly and efficiently without being required to handle the somewhat heavy packaged goods in awkward positions. This objective can be achieved by minimizing lift heights and optimizing access to the loading area.

A vending machine for packaged goods should be designed to operate using a minimum number of moving components. Any components subjected to wear should be positioned to allow easy access for repair, replacement, and maintenance. Allowing easy access to these components increases the profitability of the vending machine by increasing operational reliability and reducing or minimizing operational down time.

Another challenge that must be addressed by a vending machine for packaged goods is that the packaging materials themselves are often susceptible to damage that could allow the individual items to be dispersed from the package during the completion of a sale. If this occurs, the customer could receive an incomplete package and the loose items could cause the machine to jam, both of which decrease customer satisfaction. As a result, it is desirable to have a vending machine that dispenses packaged items with minimal disturbance and agitation to reduce the likelihood of damaging the packaging materials.

Information relevant to attempts to address these problems can be found in U.S. Pat. Nos. 6,170,702 B1; 5,881,911; 4,591,070; 4,896,792; 3,155,274 and 2,965,262 and U.S. Patent Application Publication No. 2004/0140317 A1. However, each one of these references suffers from one or more of the following disadvantages: they utilize elevators to transfer the packaged goods; they use complex devices to transfer the packaged goods from the shelves to the delivery point; they lack a simplified manner of reloading the packaged goods; they do not minimize agitation or potential damage to the packaged goods; they do not maximize the benefits of gravitational forces to facilitate the transfer of the packaged goods; and they do not configure the major components in locations that will provide for easy maintenance, repair, or replacement. For the foregoing reasons, there is a need for a novel device for vending packaged goods that overcomes the shortcomings of the prior art.

SUMMARY

We have invented a novel modular vending machine for packaged goods that satisfies the needs described in the background because it utilizes simple devices that maximize the benefits of gravity to facilitate the transfer of packaged goods, it is simple to reload, it imparts minimal agitation to the packaged goods, it provides a convenient manner for reloading, and it has the major components located to facilitate the maintenance, repair, or replacement of those items.

A novel modular vending machine for packaged goods having features of the present invention comprises a cabinet, a lower conveyor assembly for storing and conveying packaged goods that is positioned at an incline within the cabinet, one or more upper conveyor assemblies for storing and conveying packaged goods positioned parallely to each other at an incline within the cabinet each having posterior ends pivotally attached to the cabinet so that the anterior ends of the upper conveyor assemblies are vertically displaceable independently, a displacing means for vertically displacing the anterior ends of the upper conveyor assemblies independently, a retaining means for retaining the packaged goods on the upper conveyor assemblies until the upper conveyor assemblies are positioned to allow for the dispensing of the packaged goods, and a dispensing means for dispensing the packaged goods from the lower conveyor assembly and upper conveyor assemblies.

The retaining means may be accomplished using a retainer plate located within the cabinet and positioned proximal to the anterior end of the upper conveyor assembly. The retainer plate may be adjustable to accommodate various sizes of packaged goods. The dispensing means may be accomplished using a dispensing drum that is rotated by a dispensing motor mechanically connected to the dispensing drum using a chain or belt and an adjustable idler. The packaged goods stored on the lower and upper conveyor assemblies and may be displaceable by gravity. The lower and upper conveyor assemblies may be comprised of a number of rollers parallely disposed within the cabinet. The lift assembly comprises a linear actuator, a lever, and a plurality of lift bars or a winch, pulleys, and cables. The novel modular vending machine for packaged goods may be controlled using an automated control system. The automated control system may comprise a programmable logic device, such as a smart relay, a photoelectric eye transmitter and receiver, a proximity sensor, a proximity sensor indicator, and relays.

The novel modular vending machines for packaged goods may be organized in a system that is arranged to dispense packaged goods onto a common conveyor that transports the packaged goods to a dispensing bin. Each of these devices may be connected to a single user interface.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
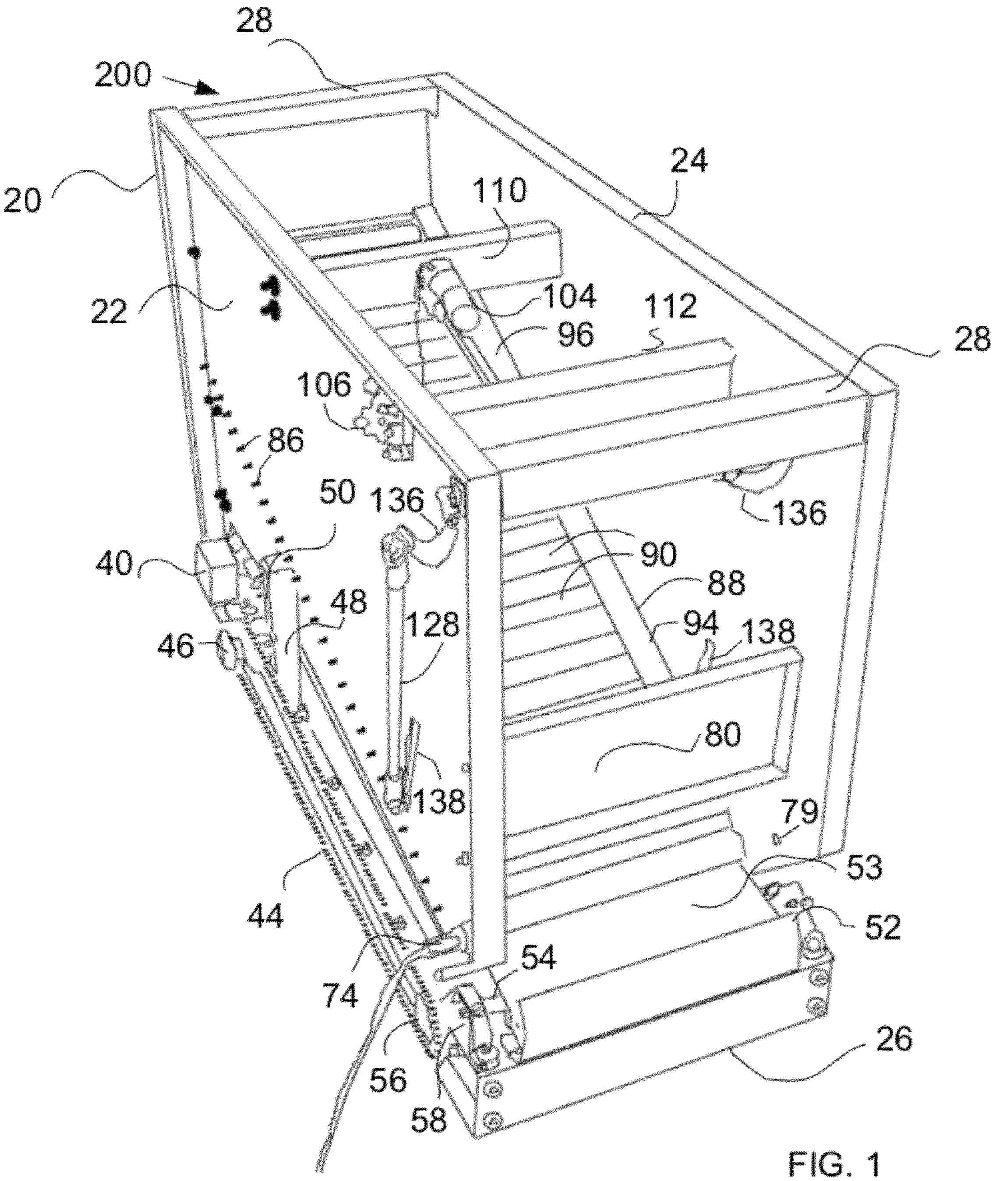
FIG. 1 is a front isometric view of the novel modular vending machine for packaged goods, according to some embodiments.

According to the present invention, a novel modular vending machine for packaged goods is disclosed. The novel modular vending machine for packaged goods includes a cabinet, a dispensing motor, a dispensing drum, a retainer plate, a lower conveyor assembly, an upper conveyor assembly, a lift assembly, and an automated control system. The cabinet has a base, a left side wall, a right side wall, and supports on the upper anterior and upper posterior corners. The base is the structural foundation for the side walls, the dispensing motor, and the dispensing drum and is constructed of rigid members such as "C," "I," angle, or square sections. The left side wall and right side wall are rigid panels mounted on the upper side of the base. The left side wall and right side wall provide mounting surfaces for the lower and upper conveyor assemblies, the lift assembly, and the retainer plate. Both the left side wall and right side wall are generally rectangular in shape with flanged edges for enhanced structural integrity. The flanged edges also serve as attachment points for other components. The left side wall and right side wall are configured to accommodate the mounting, positioning, and operation of other functional elements. For example, the lower anterior corners of the left side wall and right side wall are adapted so that the dispensing drum can be mounted directly to the base and positioned adjacent to the lower conveyor assembly. The two supports are rigidly attached between the upper corners of the left side wall and right side wall completing the box-like shape of the cabinet. The supports are rigid and can be made from a variety of cross sectional shapes such as "C," "I," angle, or square sections.

The lower conveyor assembly contains a plurality of lower rollers, each having a shaft that extends axially beyond both ends of the rollers. The lower rollers are parallely disposed within the cabinet, perpendicular to the side walls. Each roller is secured in the cabinet by positioning the ends of the shaft in opposed orifices in the side walls. The entire lower conveyor assembly is positioned at a fixed incline with the lower end of the lower conveyor assembly proximal to the dispensing drum.

The dispensing drum is generally cylinder shaped, having a notched recess that extends longitudinally for the length of the dispensing drum. The dispensing drum is positioned at the lower end of the lower conveyor assembly in a manner that allows the dispensing drum to receive the lowermost packaged good from the lower conveyor assembly. The dispensing motor is the drive mechanism for the dispensing drum. The dispensing motor is located in the lower posterior region of the cabinet and is rigidly attached to the base. The dispensing motor is mechanically attached to the dispensing drum using a chain and gears or a belt and pulleys.

The upper conveyor assembly contains a plurality of upper rollers, each having a shaft that extends axially beyond both ends of the rollers, a roller frame of generally rectangular shape, a plate, and an attachment rod. The upper rollers are parallely disposed within the roller frame, perpendicular to the roller frame. Each roller is secured in the roller frame by positioning the ends of the shaft in opposed orifices in the roller frame. The posterior end of the upper conveyor assembly is pivotally attached to the side walls using an attachment rod. The plate is securely mounted to the roller frame at the anterior end of the upper conveyor assembly. The anterior end of the upper conveyor assembly is pivotally attached to the lift assembly. The lift assembly utilizes a linear actuator to manipulate the anterior end of the upper conveyor assembly from the raised position to the lowered position.

The retainer plate is a generally rectangular plate having a slightly curved surface. The retainer plate is attached to the side walls of the cabinet and positioned such that the concave portion of the retainer plate is adjacent to the upper conveyor assembly. The position of the retainer plate is adjustable to accommodate different sizes of packaged goods.

The automated control system is comprised of a smart relay, a first relay, a second relay, a reset button, a proximity sensor, a proximity sensor indicator, a photoelectric eye transmitter, a photoelectric eye receiver, and the associated electrical connections between them. The smart relay is field programmable and controls the operation of the linear actuator and dispensing motor. The smart relay is electrically connected to the proximity sensor, the photoelectric eye transmitter, the photoelectric eye receiver, and the dispensing motor. The smart relay is also electrically connected to the first relay and second relay which are electrically connected to the linear actuator.

Figure 2:
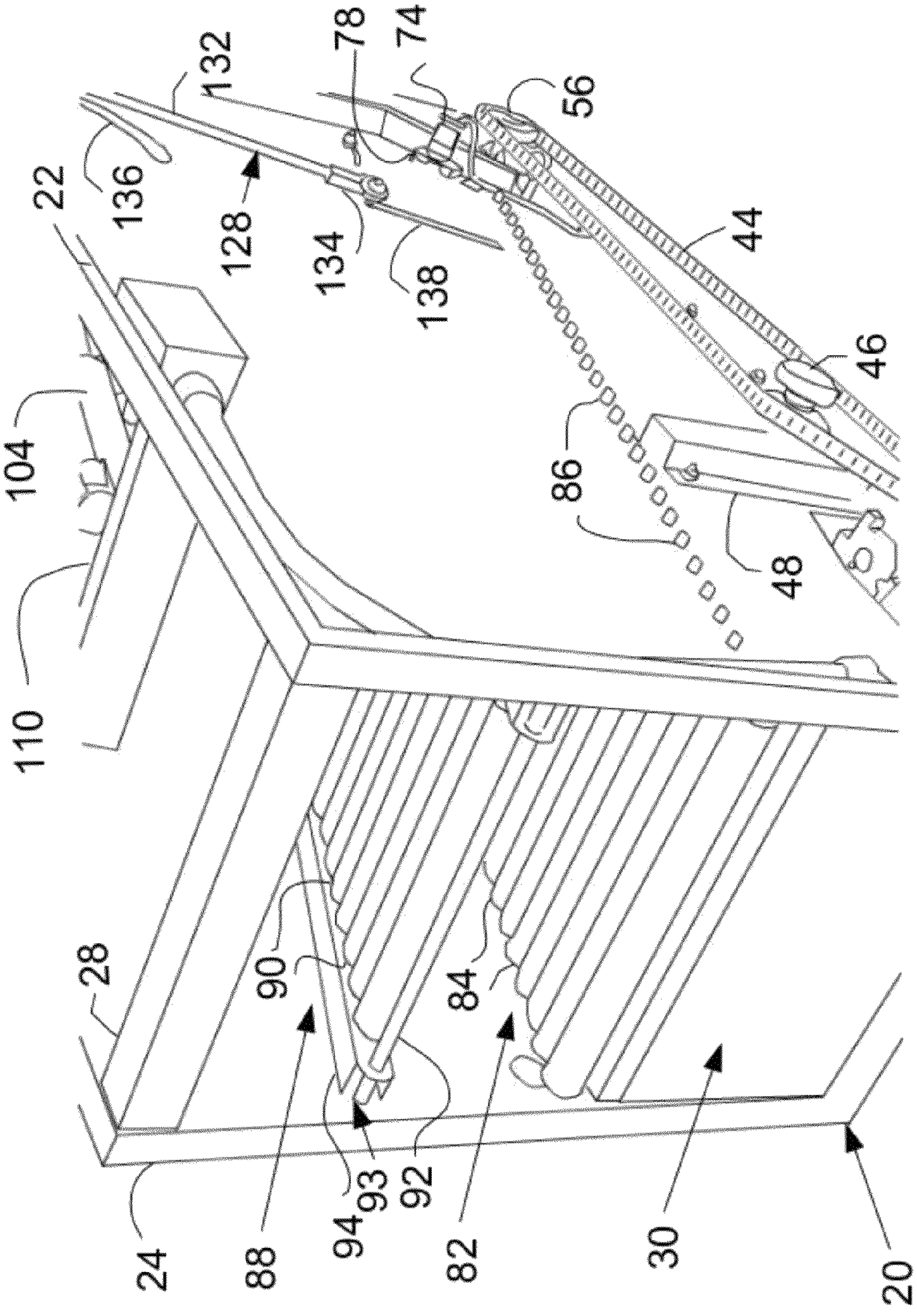
FIG. 2 is a rear isometric view of the novel modular vending machine for packaged goods (of FIG. 1), according to some embodiments.
Figure 3:
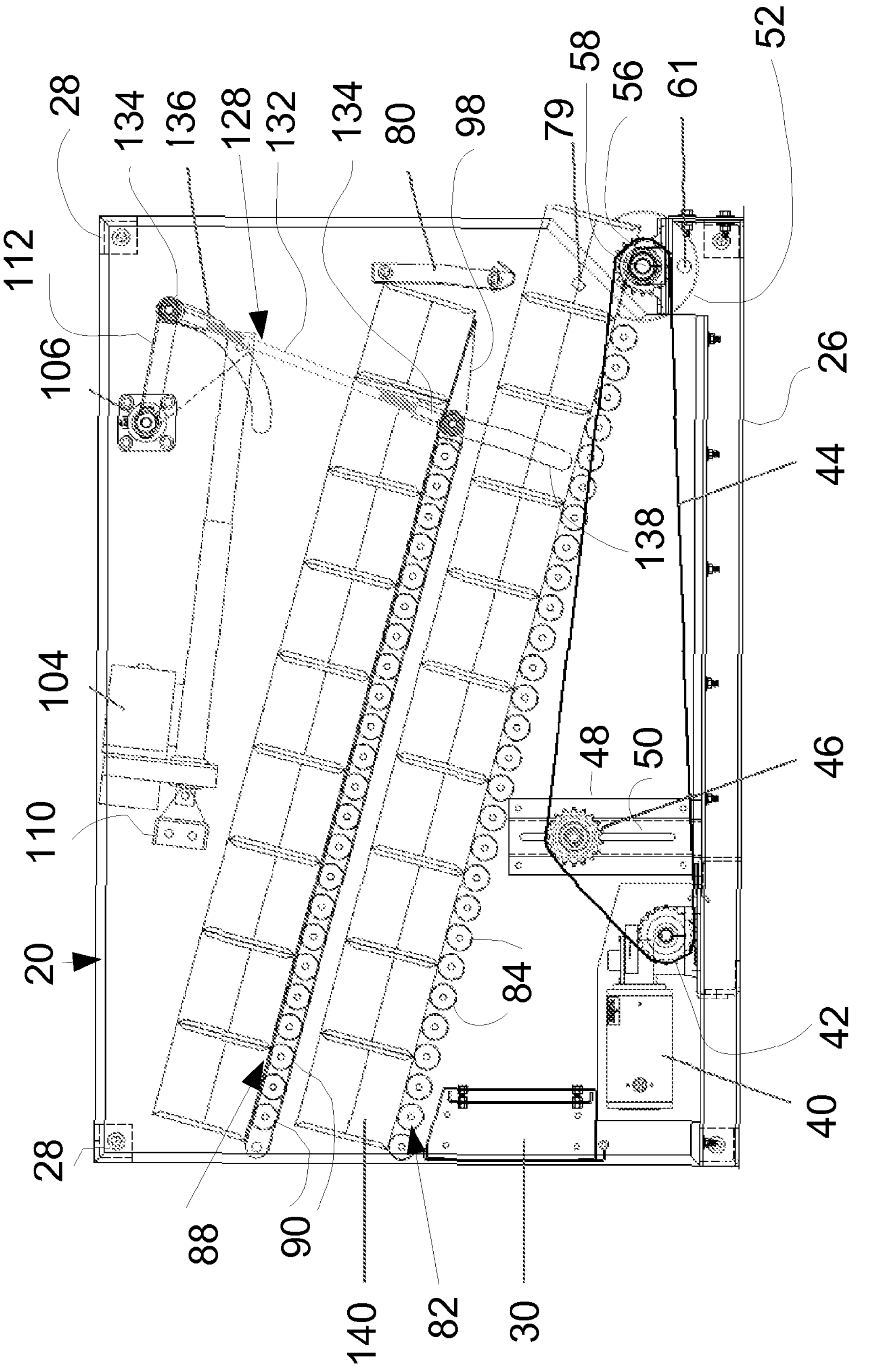
FIG. 3 is a side schematic view of the novel modular vending machine for packaged goods (of FIG. 1) in the fully loaded configuration, according to some embodiments.
Figure 4:
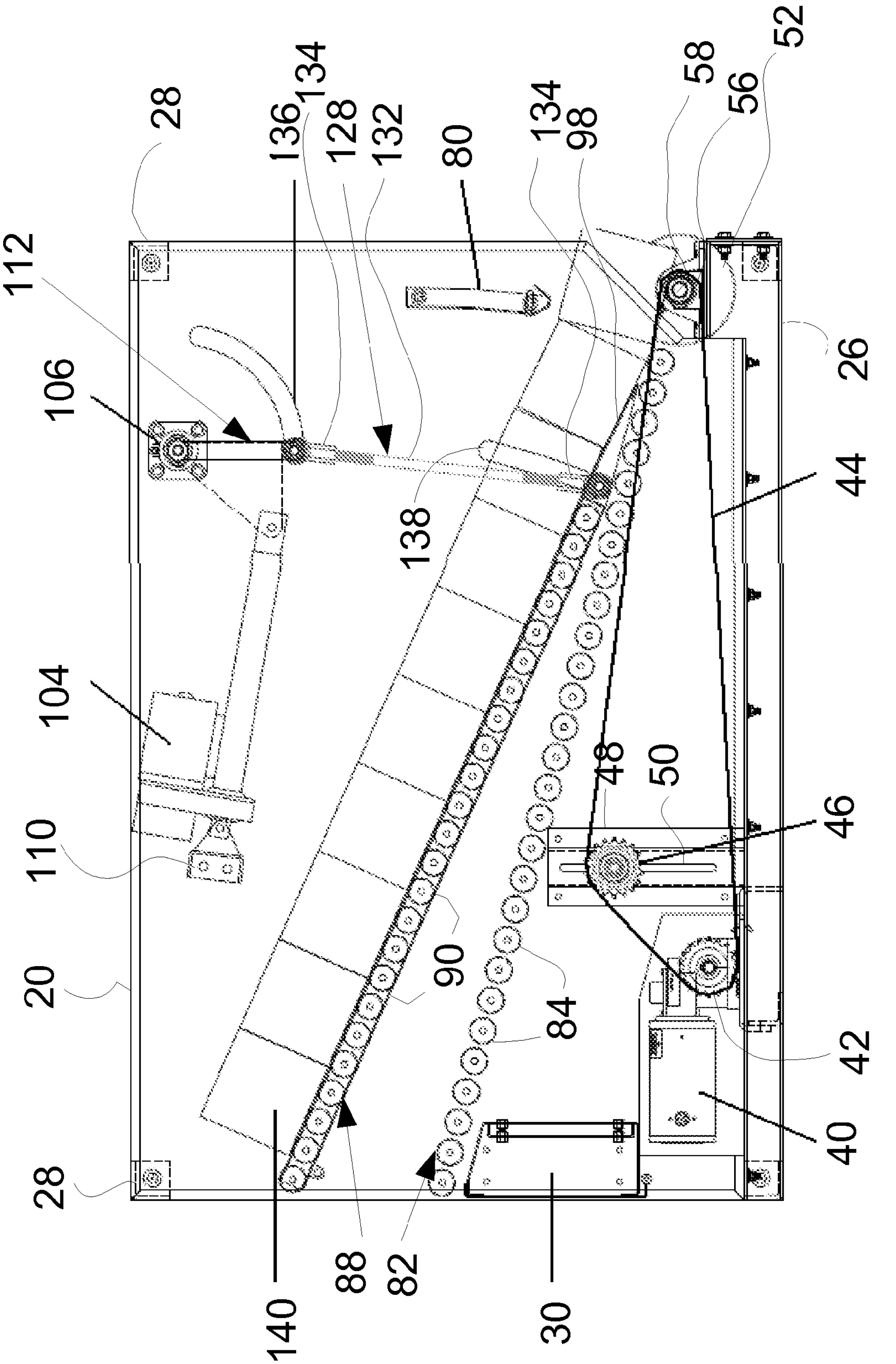
FIG. 4 is a side schematic view of the novel modular vending machine for packaged goods (of FIG. 1) with the lower conveyor assembly empty and the upper conveyor assembly fully loaded with goods and in the lowered position, according to some embodiments.
Figure 5:
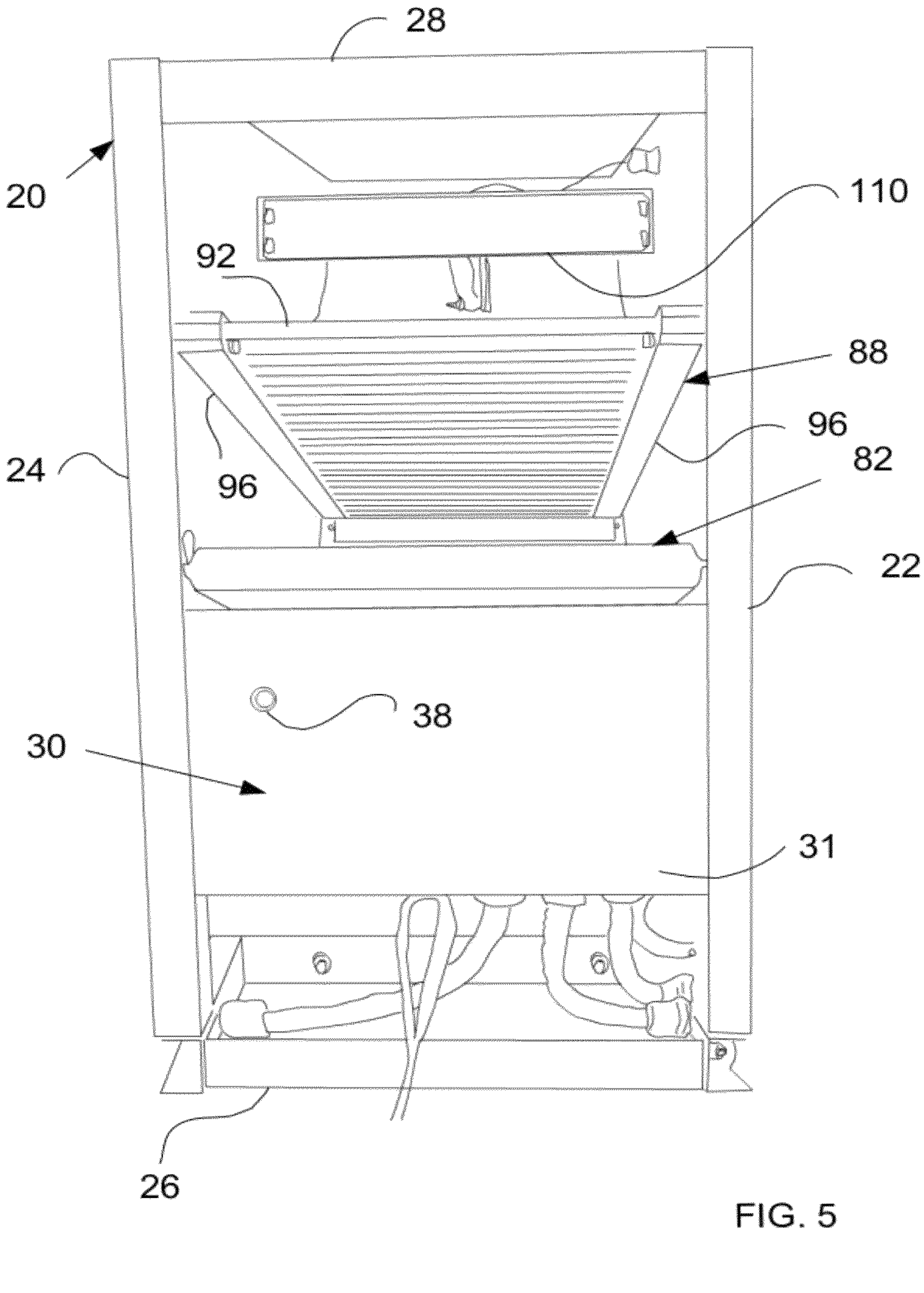
FIG. 5 is a rear view of the novel modular vending machine for packaged goods (of FIG. 1) with both the upper and lower conveyor assemblies empty and the upper conveyor assembly in the raised position.
Figure 6:
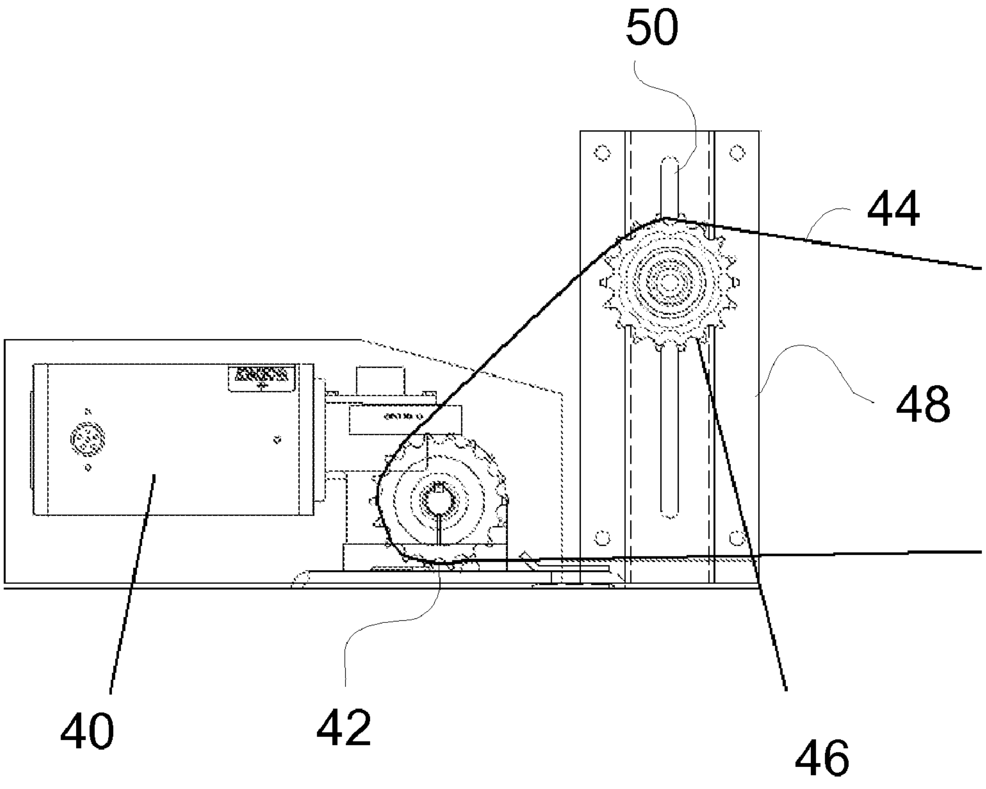
FIG. 6 is a closeup front elevation view of the dispensing motor, idler, and a portion of the drive chain assembly of the novel modular vending machine for packaged goods (of FIG. 1), according to some embodiments.
Figure 7:
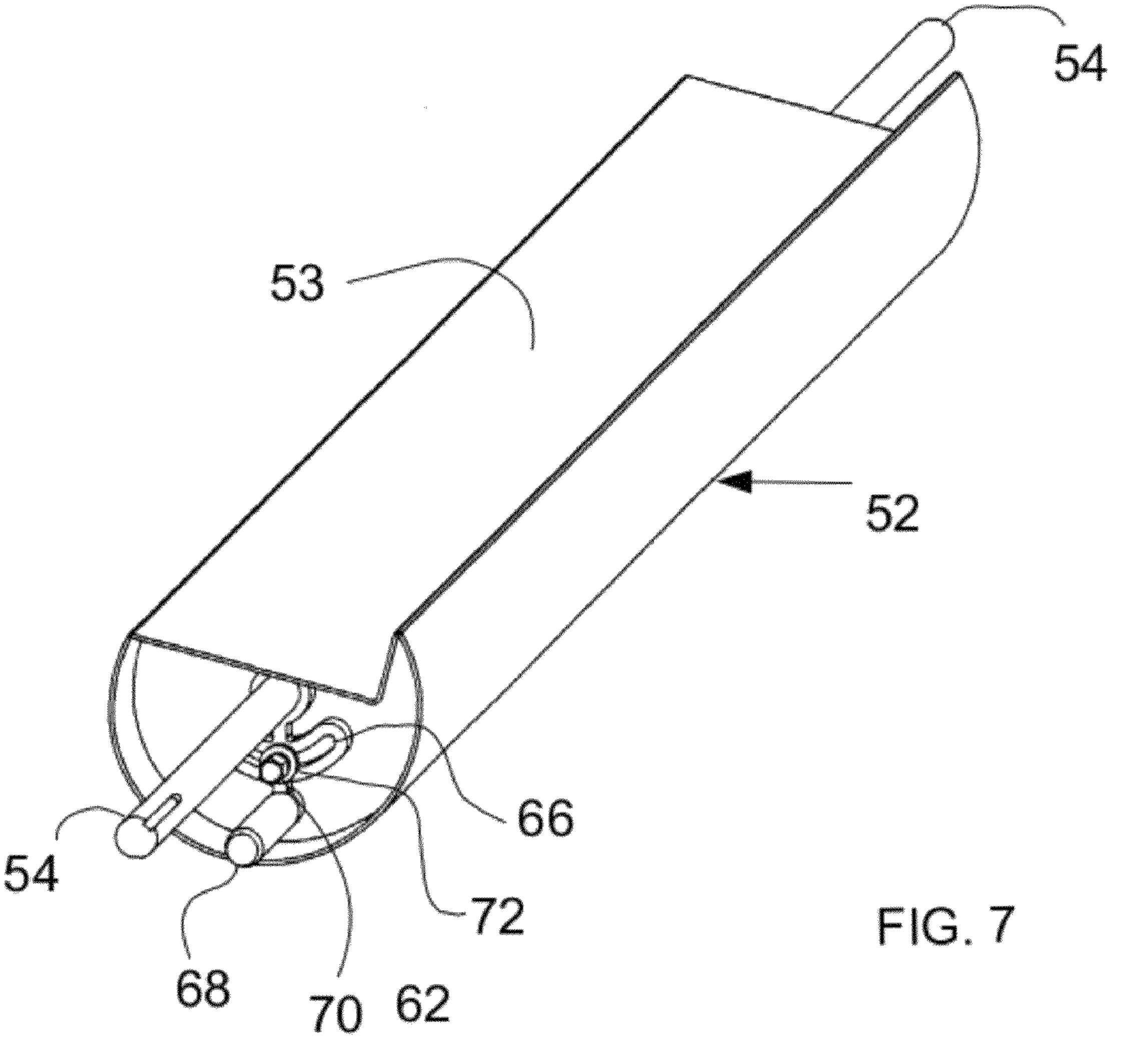
FIG. 7 is an isometric view of the dispensing drum of the novel modular vending machine for packaged goods (of FIG. 1), according to some embodiments.
Figure 8:
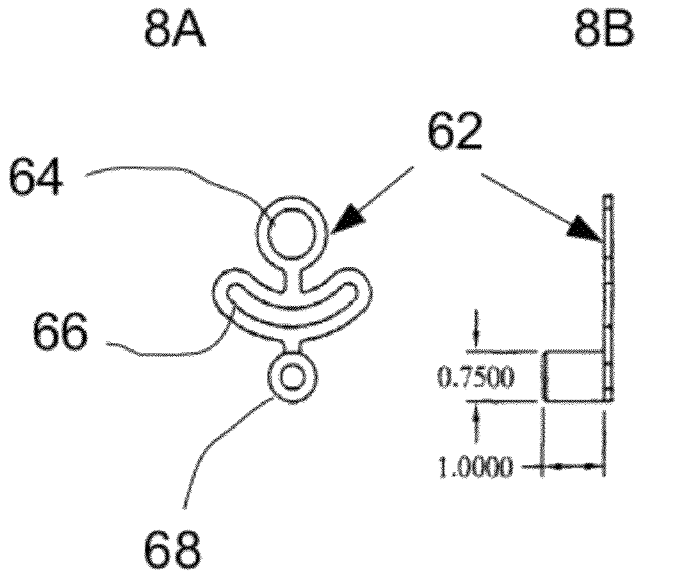
FIG. 8 is a top view and side view of the proximity sensor indicator of the novel modular vending machine for packaged goods (of FIG. 1), according to some embodiments.
Figure 9:
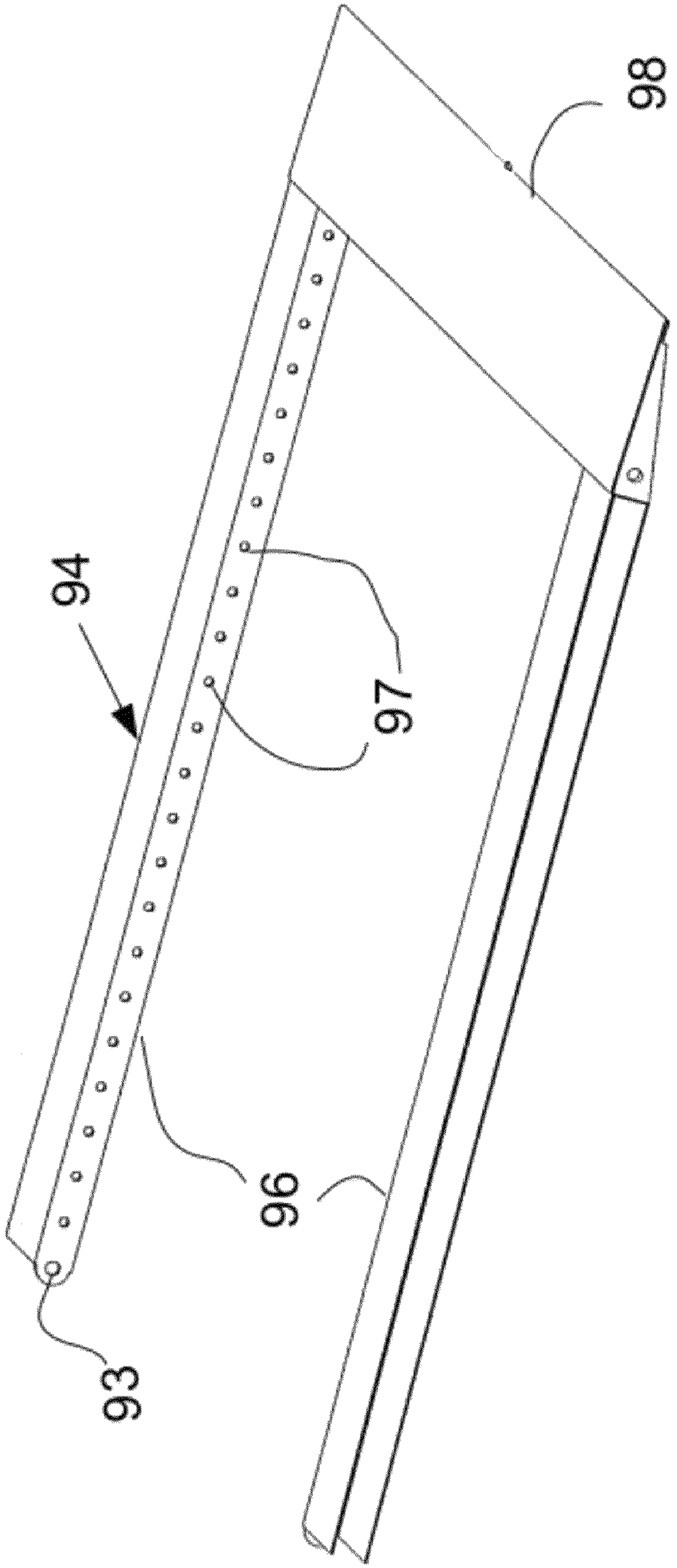
FIG. 9 is an isometric view of the roller frame from the upper roller assembly of the novel modular vending machine for packaged goods (of FIG. 1), according to some embodiments.
Figure 10:
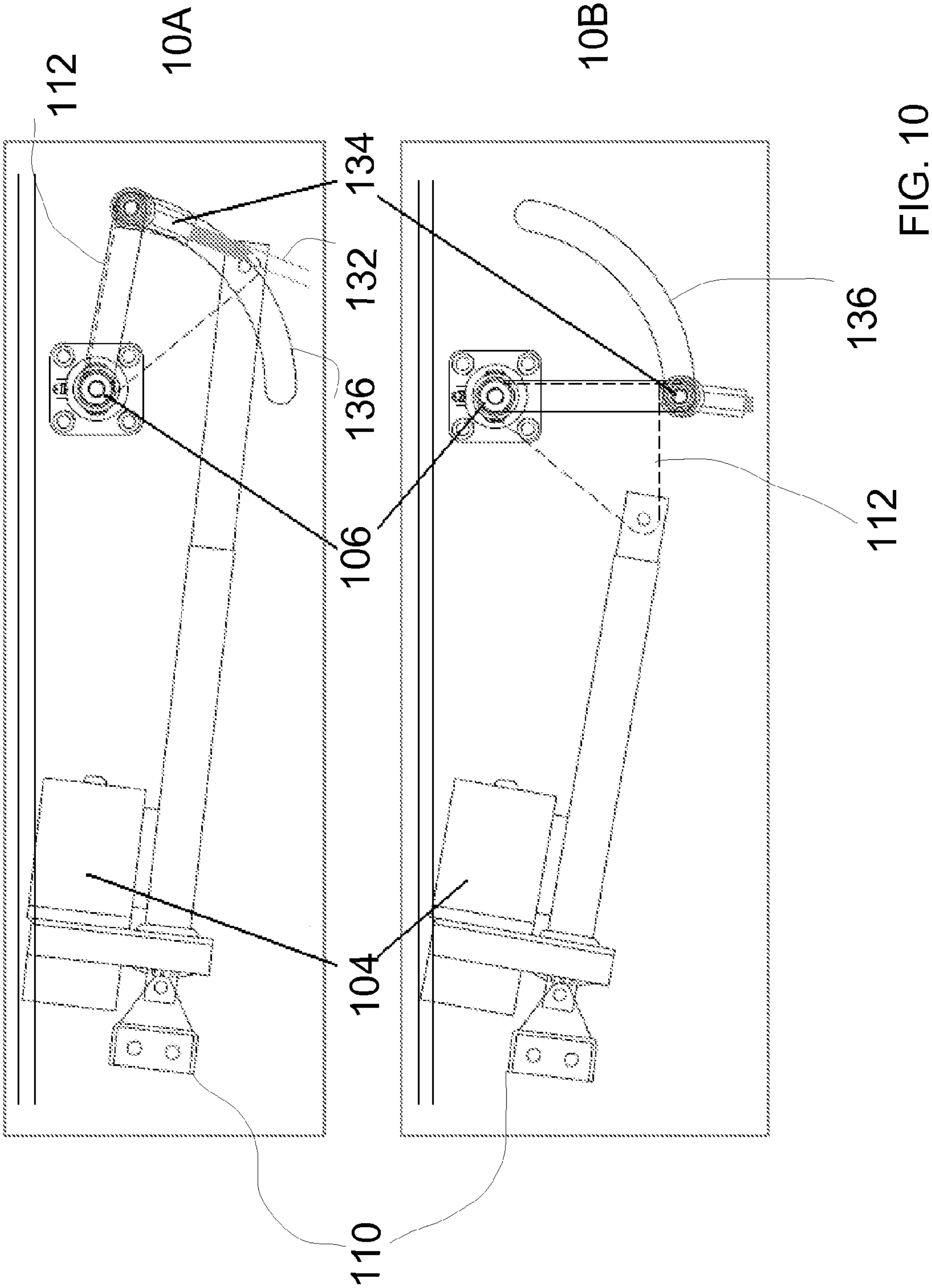
FIG. 10 is a side schematic view of the lift assembly of the novel modular vending machine for packaged goods (of FIG. 1), according to some embodiments.
Figure 11:
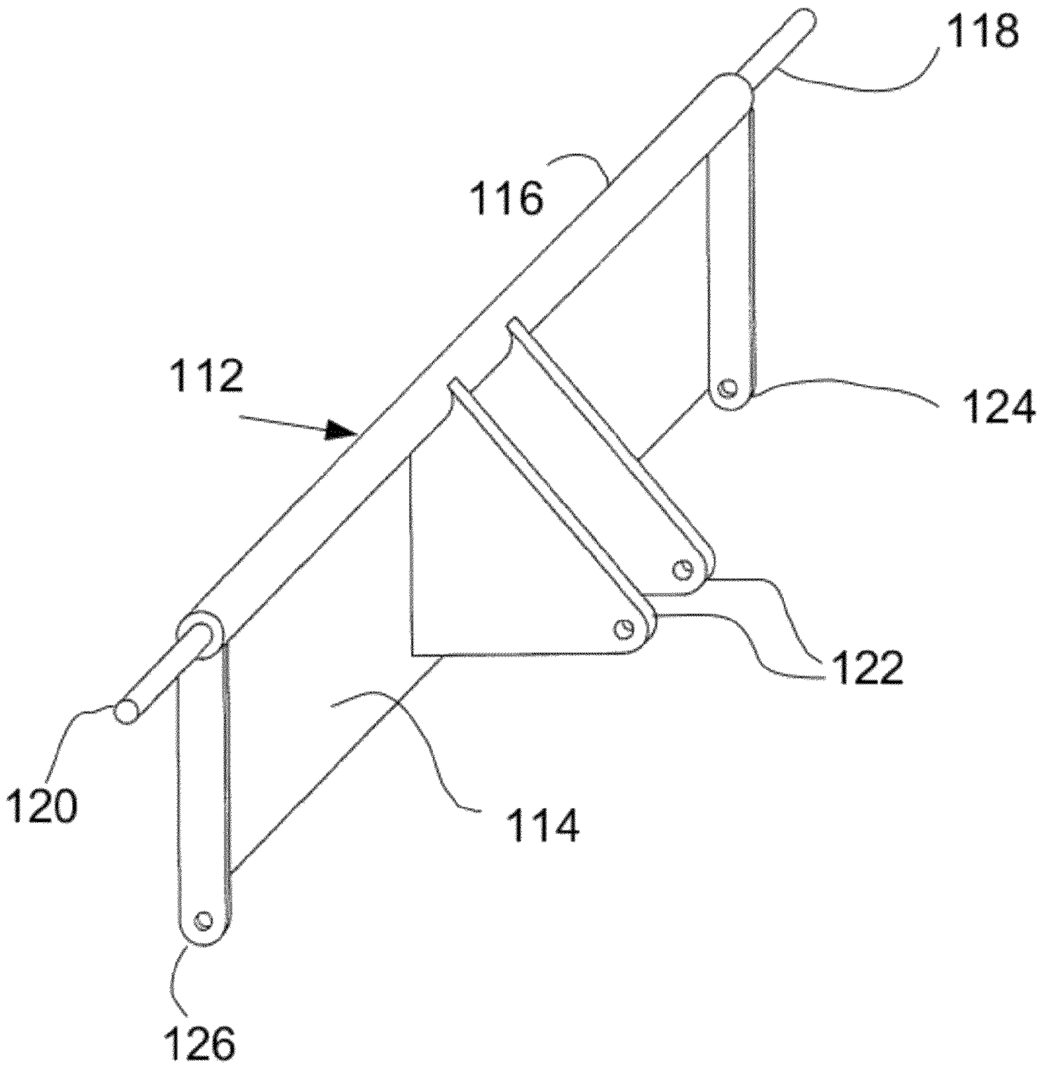
FIG. 11 is an isometric view of the lever of the novel modular vending machine for packaged goods (of FIG. 1), according to some embodiments.
Figure 12:
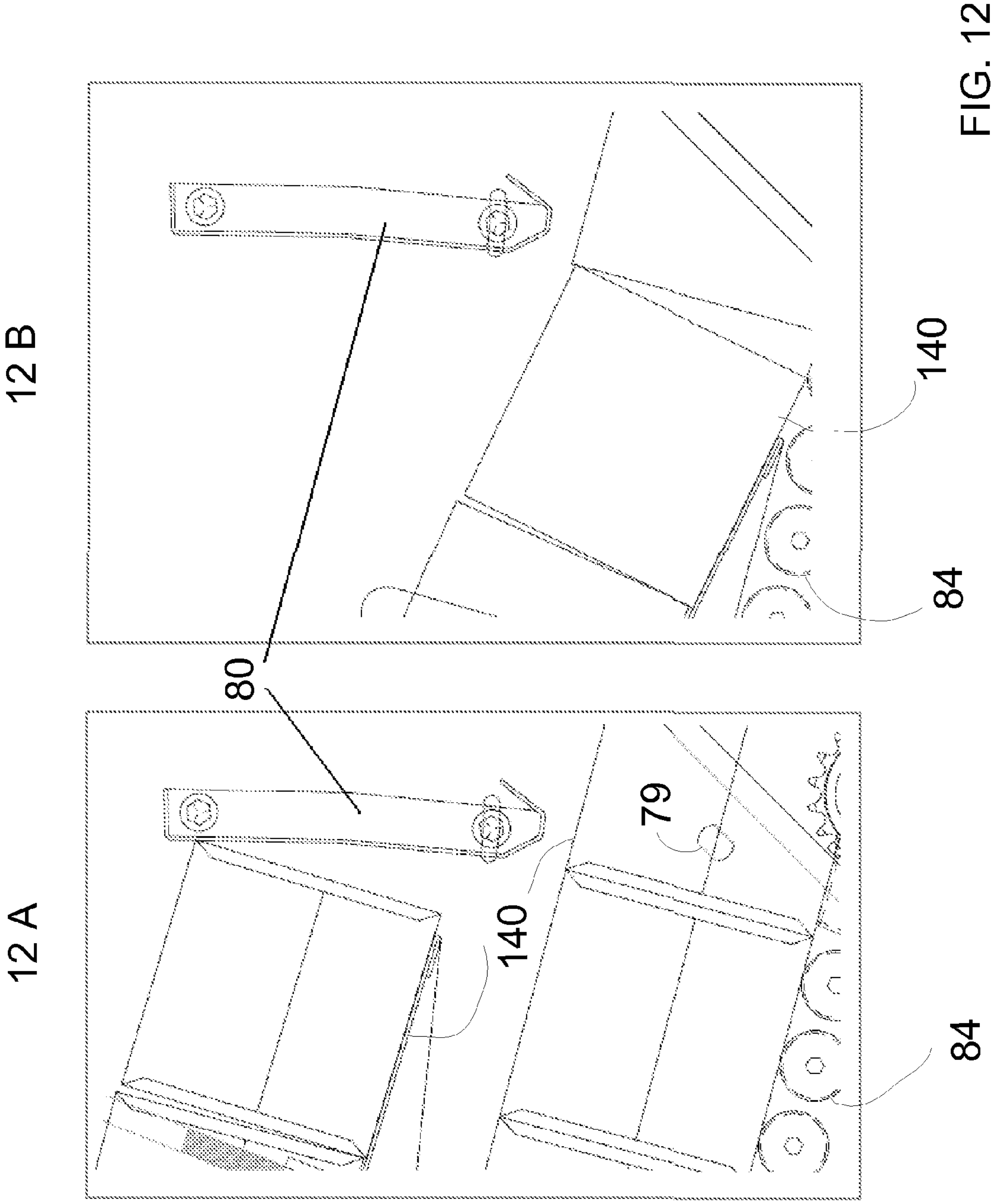
FIG. 12 is a closeup front elevation view of the retainer plate of the novel modular vending machine for packaged goods (of FIG. 1), according to some embodiments.
Figure 13:
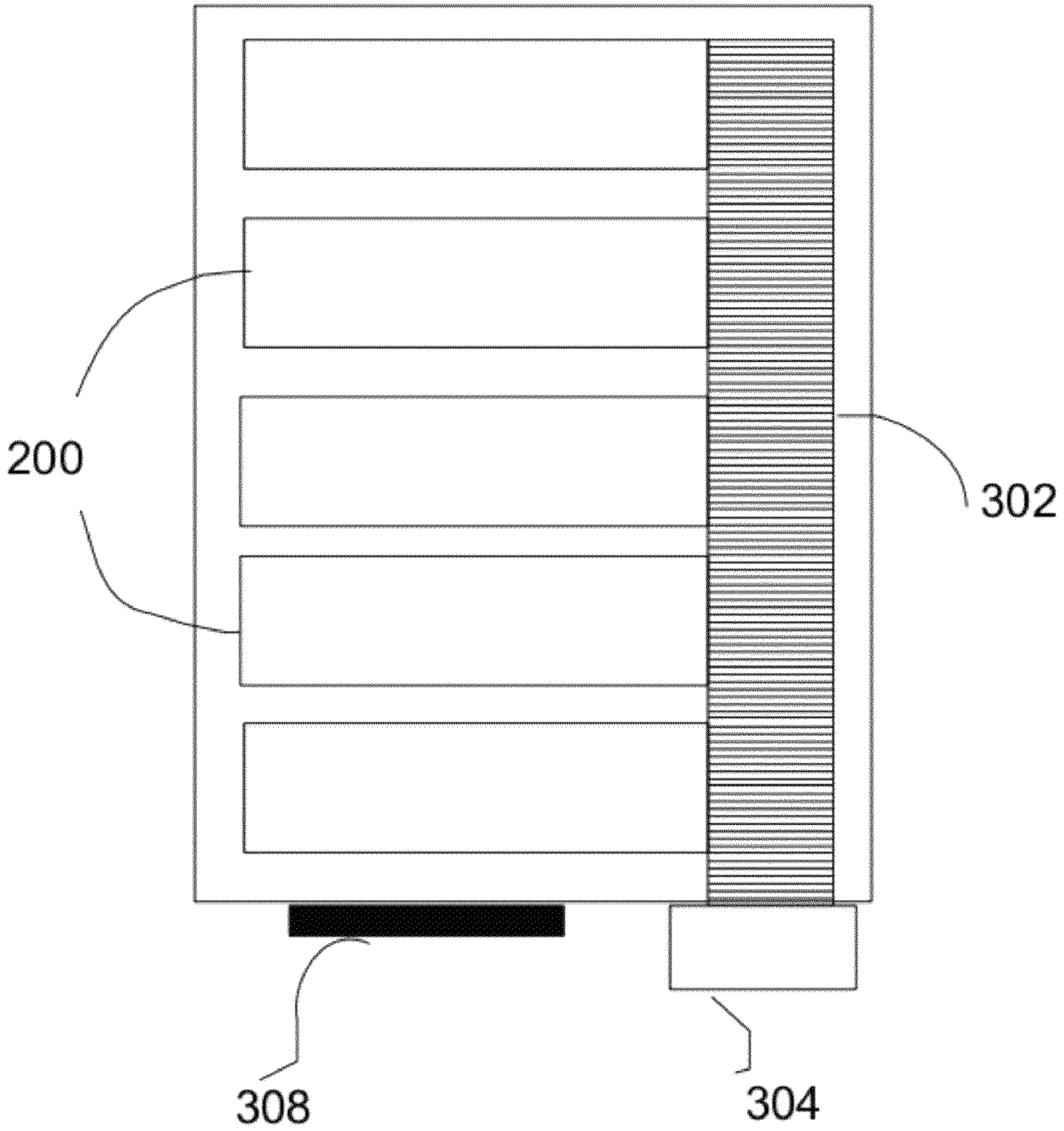
FIG. 13 is a schematic plan view of a system of novel modular vending machines for packaged goods, according to some embodiments.
Figure 14:
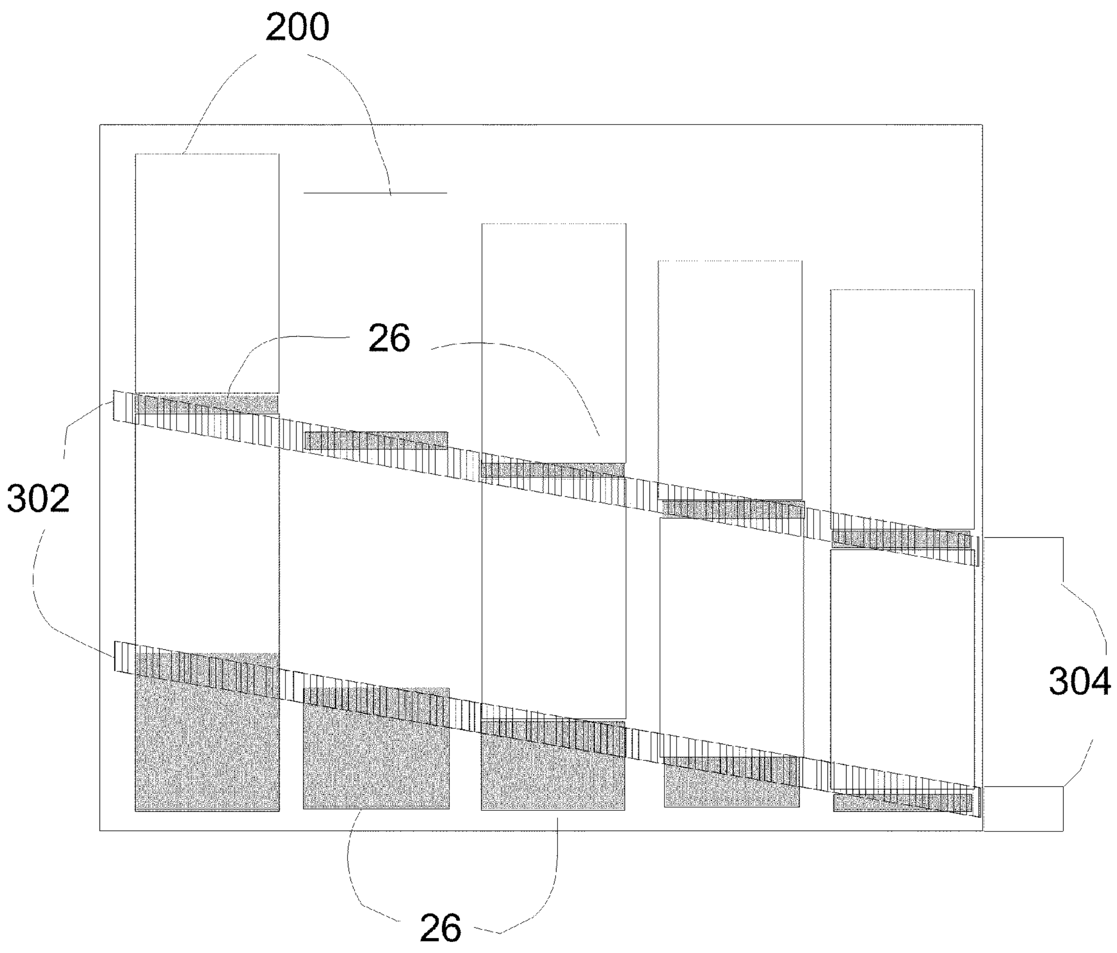
FIG. 14 is a schematic side view of a system of novel modular vending machines for packaged goods, according to some embodiments.

A novel modular vending machine for packaged goods 200, is illustrated in FIGS. 1-14. FIG. 1 is a front isometric view of the novel modular vending machine for packaged goods, according to some embodiments. FIG. 2 is a rear isometric view of the novel modular vending machine for packaged goods (of FIG. 1), according to some embodiments. FIG. 3 is a side schematic view of the novel modular vending machine for packaged goods (of FIG. 1) in the fully loaded configuration, according to some embodiments. FIG. 4 is a side schematic view of the novel modular vending machine for packaged goods (of FIG. 1) with the lower conveyor assembly empty and the upper conveyor assembly fully loaded with goods and in the lowered position, according to some embodiments. FIG. 5 is a rear view of the novel modular vending machine for packaged goods (of FIG. 1) with both the upper and lower conveyor assemblies empty and the upper conveyor assembly in the raised position. FIG. 6 is a closeup front elevation view of the dispensing motor, idler, and a portion of the drive chain assembly of the novel modular vending machine for packaged goods (of FIG. 1), according to some embodiments. FIG. 7 is an isometric view of the dispensing drum of the novel modular vending machine for packaged goods (of FIG. 1), according to some embodiments. FIG. 8 is a top view and side view of the proximity sensor indicator of the novel modular vending machine for packaged goods (of FIG. 1), according to some embodiments. FIG. 9 is an isometric view of the roller frame of the novel modular vending machine for packaged goods (of FIG. 1), according to some embodiments. FIG. 10 is a side schematic view of the lift assembly of the novel modular vending machine for packaged goods (of FIG. 1), according to some embodiments. FIG. 11 is an isometric view of the lever of the novel modular vending machine for packaged goods (of FIG. 1), according to some embodiments. FIG. 12 is a closeup front elevation view of the retainer plate of the novel modular vending machine for packaged goods (of FIG. 1), according to some embodiments. FIG. 13 is a schematic plan view of a system of novel modular vending machines for packaged goods, according to some embodiments. FIG. 14 is a schematic side view of a system of novel modular vending machines for packaged goods, according to some embodiments.

As shown in FIGS. 1-14, the novel modular vending machine for packaged goods includes a cabinet 20, a dispensing motor 40, a dispensing drum 52, a retainer plate 80, a lower conveyor assembly 82, an upper conveyor assembly 88, a lift assembly 102, and an automated control system, according to some embodiments.

Referring specifically to FIG. 1, the novel modular vending machine for packaged goods 200 is generally box-shaped being formed by the cabinet 20 comprised of a base 26, a left side wall 22, a right side wall 24, and supports 28. The base 26 is the structural foundation of the novel modular vending machine for packaged goods 200 in that the left side wall 22, the right side wall 24, the dispensing motor 40, and the dispensing drum 52 are mounted onto the base 26. Accordingly, the base 26 is comprised of members with rigid cross sections such as "C," "I," angle, or square cross sections made of strong materials such as steel that are securely fastened to each other using fasteners such as nuts and bolts, screws, or rivets. In some embodiments, the base 26 is comprised of members fastened by welding, brazing, or soldering.

The dispensing motor 40 is a commercially available part that is attached to the base 26 using fasteners such as nuts and bolts, screws, or rivets (Ref. FIG. 6). The dispensing motor 40 is located at the posterior end of cabinet 20 (See also FIGS. 3 and 4). In some embodiments, the dispensing motor 40 may be located in other areas. The dispensing motor 40 is powered electrically, but some embodiments my employ the use of pneumatic or hydraulic power. According to some embodiments, the dispensing motor 40 has a right angle output, operates at 7.7/9.3 rpm, and produces $\frac{1}{13}$ hp with a 180:1 gear ratio. The dispensing motor 40 is the drive mechanism for the dispensing drum 52 and is mechanically linked to the dispensing drum 52 through a dispensing motor gear 42, the drive chain 44, and a drive gear 56 (Ref. FIGS. 3 and 4). In some embodiments, the dispensing motor 40 is mechanically linked to the dispensing drum 52 using belts and pulleys or gears and shafts. In other embodiments, the dispensing motor 40 may be replaced with a pump and the dispensing drum 52 may be driven by hydraulic or pneumatic pressure.

The dispensing motor gear 42 is securely mated to the output shaft of the dispensing motor 40 (Ref. FIG. 6). The tension of the drive chain 44 is adjustable using an adjustable idler 46 mounted in a slot 50 located on an idler bracket 48. The slot 50 allows the adjustable idler 46 to be positioned vertically as needed to increase or decrease the tension on the drive chain 44 (Ref. FIG. 6). The idler bracket 48 is securely mounted to the left side wall 22 using fasteners such as nuts and bolts, screws, or rivets.

The dispensing drum 52 is generally cylindrical shaped having a notched recess 53 that extends longitudinally for the length of the dispensing drum 52. The notched recess 53 is visible in FIG. 1, but is more clearly shown in FIG. 7. The dispensing drum 52 is securely mated to a shaft 54. The ends of the shaft 54 are positioned through two drum bearings 58 which are mounted securely to the base 26 using fasteners such as nuts and bolts, screws, or rivets. Each drum bearing 58 has a grease fitting 142. The drive gear 56 is securely mated to the shaft 54. The dispensing drum 52, the shaft 54, and the drive gear 56 are configured such that all three components rotate at the same number of revolutions per minute, according to some embodiments (Ref. FIG. 3). Other gear ratios may be implemented as needed to accommodate packaged goods 140 of various sizes and weights.

The proximity sensor 60 is securely mounted in an orifice 61 located on the base 12 (Ref. FIG. 3). The proximity sensor 60 is adjacent to the dispensing drum 52 and is directed parallel to the longitudinal axis of the dispensing drum 52. The proximity sensor 60 is offset from the center of rotation of the dispensing drum 52. The proximity sensor 60 and the proximity sensor indicator 62 are positioned so the proximity sensor indicator 62 aligns with the proximity sensor 60 when the dispensing drum 52 rotates (Ref. FIG. 7). The proximity sensor indicator 62 is comprised of a circular opening 64, an arcuate slot 66, and a target 68. (Ref. FIGS. 7 and 8) The circular opening 64 is positioned around the shaft 54 of the dispensing drum 52. A screw 70 passes through the arcuate slot 66 and is secured to the dispensing drum 52. This configuration provides a means to adjust the angular position of the proximity sensor indicator 62. The screw 70 may be retained by a lock washer 72.

The photoelectric eye transmitter 74 and photoelectric eye receiver 76 are attached to photoelectric eye brackets 78 using fasteners such as nuts and bolts, screws, or rivets (Ref. FIGS. 1, 3, and 4). The photoelectric eye brackets 78 are securely mounted on opposed sides of the cabinet 20, proximal to the dispensing drum 52. Orifices 79 situated on the left side wall 22, the right side wall 24, and the photoelectric eye brackets 78 provide line-of-sight between the photoelectric eye transmitter 74 and photoelectric eye receiver 76. The presence of the packaged good 140 on the dispensing drum 52 blocks the line-of-sight between the photoelectric eye transmitter 74 and receiver 76. The photoelectric eye transmitter 74 and the photoelectric eye receiver 76 may be mounted on either side of the cabinet 20.

The lower conveyor assembly 82 is comprised of a plurality of lower rollers 84 mounted perpendicular to the left side wall 22 and right side wall 24 (Ref. FIGS. 1-5). The lower rollers 84 are commercially available aluminum rollers having a shaft 86 that spans the longitudinal axis, according to some embodiments. The lower rollers 84 are approximately 15.5 inches long with the shaft 86 being approximately 17 inches long, according to some embodiments. The lower rollers 84 are pivotally secured by inserting the ends of the shaft 86 into two symmetrically opposed orifices 87 located in the left side wall 22 and the right side wall 24. The shaft 86 utilizes a spring-loaded mechanism (not shown) that allows the shaft 86 to be displaced in one axial direction for installation and removal of the lower roller 84. The lower conveyor assembly 82 is disposed at an incline so that the packaged goods 140 (Ref. FIGS. 2 and 3) move toward the dispensing drum 52 by gravity. The posterior end of the cabinet 20 is designed to allow unobstructed access to the lower conveyor assembly 82 for loading or unloading of packaged goods 140 onto the lower conveyor assembly 82 (Ref. FIG. 5).

As shown in FIGS. 1-5, the upper conveyor assembly 88 is comprised of a plurality of upper rollers 90, an attachment rod 92, and a roller frame 94. The upper conveyor assembly 88 is oriented at an incline such that the posterior end of the upper conveyor assembly 88 is positioned at a height greater than the anterior end of the upper conveyor assembly 88. The upper rollers 90 are similar to the lower rollers 84 except that the upper rollers 90 are approximately 12.5 inches long having a shaft 100 that is approximately 15 inches long, according to some embodiments. The posterior end of the cabinet 20 is designed to allow unobstructed access to the upper conveyor assembly 88 for loading or unloading of packaged goods 140 onto the upper conveyor assembly 88 (Ref. FIG. 5).

The roller frame 94 is comprised of two parallely disposed elongated members 96 that provide structural support for the upper rollers 90 and a plate 98 (Ref. FIG. 9). Each member 96 of the roller frame 94 has a "C" cross-section, according to some embodiments. Other cross-sectional shapes, such as angle or square cross-sections may be used. The upper rollers 90 are mounted perpendicular to the members 96 of the roller frame 94. The upper rollers 90 are pivotally secured to the roller frame 94 by engaging the ends of the shaft 100 on each end of upper roller 90 into symmetrically opposed orifices 97 located in the members 96 of the roller frame 94. The plate 98 is securely attached to the anterior end of the upper conveyor assembly 88. The plate 98 is generally wedge shaped and provides a smooth transition from the upper conveyor assembly 88 to the dispensing drum 52 for the packaged goods 140 when the upper conveyor assembly 88 is in the lowered configuration (Ref. FIG. 4). The posterior end of the upper conveyor assembly 88 is pivotally attached to the cabinet 20 using the attachment rod 92. The attachment rod 92 is inserted through orifices 93 on the left side wall 22, the right side wall 24, and the roller frame 94. (Ref. FIGS. 2, 3 and 9). The attachment rod 92 is axially contained using fasteners such as keys, pins, clips, or keepers.

The anterior end of the upper conveyor assembly 88 is pivotally attached to the lift assembly 102 (FIGS. 1-4). The lift assembly 102 is used to raise and lower the upper conveyor assembly 88. The upper conveyor assembly 88 is disposed at an incline so that the packaged goods 140 (Ref. FIGS. 3 and 4) are displaced from the posterior of the upper conveyor assembly 88 to the anterior of the upper conveyor assembly 88 by gravity.

In some embodiments, the lower conveyor assembly 82 or upper conveyor assembly 88 may be comprised of roller conveyors (with or without a conveyor rack), wheel conveyors, or ball conveyors. In accordance with another embodiment of the invention, the lower conveyor assembly 82 or upper conveyor assembly 88 may be motorized rather than being gravity conveyors, in which case a suitable motor is provided as well as control means for activating the conveyor and controlling operation thereof.

As shown in FIGS. 1, 3 and 4, the lift assembly 102 is comprised of a linear actuator 104, a first pivot bearing 106, a second pivot bearing 108 (not shown), a linear actuator mounting bracket 110, a lever 112, a first lift bar 128, a second lift bar 130 (not shown), upper guide slots 136, and lower guide slots 138. Other embodiments of the lift assembly 102 may utilize a winch, pulley, and cable system to manipulate the upper conveyor assembly 88.

The linear actuator 104 is a commercially available electric actuator. According to some embodiments, the linear actuator 104 has an 8 inch variable thrust and is capable of lifting up to 250 lbs at a speed of 25 inches per minute. Other types of linear actuators 104 may be utilized, such as pneumatic or hydraulic actuators. The static end of the linear actuator 104 is pivotally attached to the linear actuator mounting bracket 110 and the dynamic end is pivotally attached to the lever 112 (Ref. FIGS. 1 and 10). The linear actuator mounting bracket 110 is generally rectangular in shape having an angled cross-section. Other cross-sections may be used. The linear actuator mounting bracket 110 is fastened securely between the left side wall 22 and the right side wall 24 using fasteners such as nuts and bolts, screws, or rivets. The linear actuator mounting bracket 110 is constructed of rigid materials having sufficient strength to support the weight of the upper conveyor assembly 88 fully loaded with packaged goods 140 (Ref. FIG. 3).

The lever 112 is generally rectangular in shape comprising a planar surface 114, a rounded edge 116, a first shaft 118, a second shaft 120, a triangle bracket 122, a first hinge point 124, and a second hinge point 126 (Ref. FIG. 11). The lever 112 is pivotally mounted to the first pivot bearing 106 and second pivot bearing 108 by positioning the first shaft 118 in the first pivot bearing 106 and positioning the second shaft 120 in the second pivot bearing 108. The first pivot bearing 106 and the second pivot bearing 108 are mounted securely to the cabinet 20 using fasteners such as nuts and bolts, screws, or rivets (Ref. FIG. 10). The lever 112 is positioned so the triangle bracket 122 is directed toward the linear actuator 104 and the first hinge point 124 and second hinge point 126 are directed toward the upper conveyor assembly 88 (Ref. FIG. 3). The dynamic end of the linear actuator 104 is pivotally attached to the lever 112 at the outermost vertex of the triangle bracket 122 (Ref. FIGS. 3, 10, and 11) using fasteners such as a bolt and nut or pin and key.

One end of the first lift bar 128 is pivotally attached to the lever 112 at the first hinge point 124 and the opposed end of the first lift bar 128 is pivotally attached to the upper conveyor assembly 88 (Ref. FIGS. 1, 3, and 4). The second lift bar 130 is attached in a similar manner on the opposed side of the lift assembly 102 (not shown). The first lift bar 128 and second lift bar 130 are of similar construction. Each lift bar is comprised of a rod 132 with threaded ends having threaded eye fittings 134 attached at each end. The length of the first lift bar 128 and second lift bar 130 may be adjusted by manipulating the placement of the eye fittings 134 on the threaded ends of the first lift bar 128 and second lift bar 130, according to some embodiments. The first lift bar 128 and second lift bar 130 are rigid. Other embodiments may employ different tension bearing members, such as chains or cables.

Upper guide slots 136 and lower guide slots 138 are positioned on the left side wall 22 and right side wall 24 incident to the paths of the attachment points between the first lift bar 128, the second lift bar 130, the lever 112, and the lower conveyor assembly 82 (FIGS. 1, 3, and 4). The upper guide slots 136 and lower guide slots 138 provide an unobstructed path for the lift assembly 102 to raise and lower the upper conveyor assembly 88 (Ref. FIGS. 1, 3, and 4). The upper guide slots 136 are arcuate having a radius approximately equal to the length of the lever 112 (Ref. FIG. 10). The lower guide slots 138 are arcuate having a radius approximately equal to the length of roller frame 94 of the upper conveyor assembly 88 (Ref. FIG. 3-4). The upper guide slots 136 and the lower guide slots 138 are large enough to provide clearance between the lift assembly 102 and the cabinet 20.

The retainer plate 80 is a mostly rectangular, arcuate plate with flanged edges for structural integrity and mounting purposes (Ref. FIGS. 1-3 and 6). Referring specifically to FIG. 12, the retainer plate 80 is attached to orifices in cabinet 20 using fasteners such as nuts and bolts or screws. Some or all of these orifices may be slotted to allow for the position of the retainer plate 80 to be adjusted. The retainer plate 80 is positioned so the concave portion of the retainer plate 80 is adjacent to the upper conveyor assembly 88.

The above-described elements are generally composed of metal, although any or all of these elements may alternately be composed of aluminum, steel, tin, copper, or some composite material including an amalgam of different metals or materials.

An electronics compartment 30 is a generally box shaped object having a hinged cover 31. It is positioned proximal to the dispensing motor 40 in the posterior portion of the cabinet 20 (Ref. FIG. 5). The smart relay 32, the first relay 34, and the second relay 36 are securely mounted inside the electronics compartment 30 using fasteners such as nuts and bolts, screws, or rivets. These components may be mounted to a board that is removably mounted to the inside of the electronics compartment 30 to allow for simplified removal and replacement of all three components when a novel modular vending machine for packaged goods 200 needs to be serviced in the field. The reset button 38 is securely positioned on the exterior of the hinged cover 31 so that it is readily accessible for reloading of the device (Ref. FIG. 5).

The smart relay 32 is electrically connected to the dispensing motor 40, the first relay 34, the second relay 36, the reset button 38, the photoelectric eye transmitter 74, the photoelectric eye receiver 76, the proximity sensor 60, and the linear actuator 104. The smart relay 32, the first relay 34, the second relay 36, the reset button 38, the photoelectric eye transmitter 74, the photoelectric eye receiver 76, and the proximity sensor 60 are collectively referred to as the automated control system. These items are commercially available and the configurations available to effectuate the purposes described herein are commonly known in the art of automated controls.

Referring to FIG. 13, a schematic plan view of a system of modular vending machines 300 is shown. The system of modular vending machines 300 is arranged to allow each novel modular vending machine for packaged goods 200 to utilize a common conveyor 302 to transfer the packaged goods 140 to a dispensing bin 304. The common conveyor 302 is positioned at an incline so that the packaged goods 140 vended from each modular vending machine 200 will move under the force of gravity to the dispensing bin 304.

FIG. 14 shows a schematic side view of the system of modular vending machines 300. From this view, it is evident that the novel modular vending machines for packaged goods 200 may be stacked to increase the vending capacity of the system of modular vending machines 300. As shown in FIG. 14, the height of the base 26 may be varied so that each novel modular vending machine for packaged goods 200 can utilize the inclined common conveyor 302. Other configurations that maximize the vending capacity and utilize a common conveyor are possible.

Although not shown in detail, the system of novel modular vending machines for packaged goods 300 is further fitted with a user interface 308, which comprises a product selection module fitted with a plurality of selection buttons for a customer to select the type and amount of packaged goods 140 to be purchased, and a display for providing the user with operating instructions, information regarding the goods, and advertising. The user interface 308 further comprises a paying module fitted, for example, with a coin insertion and return slot, credit card slot, bill receiving slot, and an operation canceling knob. Each selection button will be electrically connected to the smart relay 32 of the particular novel modular vending machine for packaged goods 200 that contains packaged goods 140 that correspond to the product indicated on the selection button. The configuration and operation of the user interface 308 is commonly known in the art of automated controls.

A fully loaded novel modular vending machine for packaged goods 200 in the fully loaded configuration is shown in FIG. 3. In this configuration, the upper conveyor assembly 88 is in the raised position and both the upper conveyor assembly 88 and lower conveyor assembly 82 are fully loaded with packaged goods 140. When a vend is initiated the smart relay 32 activates the dispensing motor 40. The dispensing motor 40 rotates the dispensing motor gear 36 in a clockwise direction (as viewed in FIG. 3). The rotation from the dispensing motor gear 36 is imparted on the drive gear 56 causing the dispensing drum 52 to rotate in a clockwise direction (as viewed in FIG. 3). The dispensing drum 52 transfers the packaged good 140 to a common conveyor 302 that delivers the packaged good 140 to the dispensing bin 304 for retrieval by the purchaser (Ref. FIG. 13-14). As the dispensing drum 52 rotates to transfer the packaged good 140, the circular surface area of the dispensing drum 52 prevents the adjacent packaged good 140 from moving into position until the dispensing drum 52 makes a complete revolution. When the proximity sensor indicator 62 is adjacent to the proximity sensor 60 (Ref. FIGS. 1,3, and 7), the proximity sensor 60 signals the smart relay 32 that the dispensing drum 52 has made a complete revolution. Upon receipt of the signal, the smart relay 32 deactivates the dispensing motor 40 thereby stopping the rotation of the dispensing drum 52. The notched recess 53 of the dispensing drum 52 is oriented for the next packaged good 140 to slide into position on the dispensing drum 52 for the next vend. The packaged good 140 moves under the force of gravity. This process is repeated for a preset number of iterations as determined by the programming of the smart relay 32. When the preset number of iterations occurs, the smart relay 32 signals the first relay 34 to retract the linear actuator 104 (Ref. FIG. 10, View B). The retraction of the linear actuator 104 causes the lift assembly 102 to lower the upper conveyor assembly 88 onto the lower conveyor assembly 82 so that the packaged goods 140 on the upper conveyor assembly 88 can be dispensed (Ref. FIG. 4).

The preset number of iterations is determined by the number of packaged goods 140 that can be stored on the lower conveyor assembly 82. The number of packaged goods 140 that can be stored on the lower conveyor assembly 82 varies with the size of the packaged goods 140. For example, in FIG. 3 a maximum number of nine packaged goods can be stored on the lower conveyor assembly 82 while one packaged good 140 is located on the dispensing drum 52. Accordingly, the preset number of iterations is nine for the size of the packaged goods 140 shown in FIG. 3. In this embodiment, the smart relay 32 signals the first relay 34 to retract the linear actuator 104 when the dispensing drum 52 makes nine revolutions (or vends nine of the packaged goods 140). This programmable feature of the smart relay 32 allows the novel modular vending machine for packaged goods 200 to be adapted to dispense packaged goods 140 of various sizes.

When the upper conveyor assembly 88 is in the lowered position, the packaged goods 140 on the upper conveyor assembly 88 are ready to be dispensed. In this configuration, the smart relay 32 signals the dispensing motor 40 to drive the dispensing drum 52 one revolution. No counter is utilized as the packaged goods 140 are dispensed from the upper conveyor assembly 88. Instead, the photoelectric eye receiver 76 (Ref. FIG. 1) senses that the lower conveyor assembly 82 is empty when a packaged good 140 is not present to block the signal from the photoelectric eye transmitter 74 for a continuous ten-second time period. Other time periods may be utilized to attain this result. When this condition is met, the smart relay 32 "locks" the novel modular vending machine for packaged goods 200 so that no vends can be initiated for that specific module. When the novel modular vending machine for packaged goods 200 is "locked," the reset button 38 and a "sold out" indicator light, located on the selection button on the user interface 308 (Ref. FIG. 13), are illuminated. When the reset button 38 is pressed, the smart relay 32 signals the second relay 36 to extend the linear actuator 104, thereby raising the upper conveyor assembly 88 to the raised position (Ref. FIG. 3). Depressing the reset button 38 also resets the preset counter in the smart relay 32 to zero and discontinues the illumination of the reset button 38 and "sold out" indicator light. In this configuration, the novel modular vending machine for packaged goods 200 is ready to be reloaded. Reloading is performed by placing the packaged goods 140 onto the posterior end of the upper conveyor assembly 88 and lower conveyor assembly 82 (Ref. FIG. 2). The reset button 38 can be depressed at any time, whether the device is partially or totally empty. Pressing the reset button 38 allows the novel modular vending machine for packaged goods 200 to be reloaded to the full configuration.

As shown in FIG. 12, the retainer plate 80 retains the lowermost packaged good 140 on the upper conveyor assembly 88 in position while the upper conveyor assembly 88 is raised and lowered. View 12A shows the retainer plate 80 interface with the lowermost packaged good 140 located on the upper conveyor assembly 88 in the raised position. If the upper conveyor assembly 88 is in the process of being lowered onto the lower conveyor assembly 82, the lowermost packaged good 140 on the upper conveyor assembly 88 is retained in place until the upper conveyor assembly 88 is completely lowered onto the lower conveyor assembly 82. Then, the lowermost packaged good 140 is positioned to move onto the dispensing drum 52 after another vend occurs (Ref. View 12B). If the upper conveyor assembly 88 needs to be raised for maintenance or restocking purposes, the retainer plate 80 retains the adjacent packaged good 140 in position while the upper conveyor assembly 88 is raised.

The previously described versions of the present invention have many advantages. For example, the invention is designed so that the size, weight, and configuration of the components can accommodate heavy packaged goods in a cost effective and reliable manner. The width of the cabinet 20 is minimized because it is only required to be slightly wider than the largest product to be sold. This is effectuated by mounting the lower rollers 84 directly to the walls of the cabinet 20, by designing the upper conveyor assembly 88 to pivotally attach directly to the walls of the cabinet 20, and by positioning the first lift bar 128 and second lift bar 130 on the outside of the cabinet 20.

The use of the rollers 90 on the upper conveyor assembly 88 and the roller 84 on the lower conveyor assembly 82 coupled with the inclined positioning of these assemblies allows the packaged goods 140 to move into the vending position solely by the force of gravity. This limits the energized components used to transfer the packaged goods 140 to the dispensing motor 40 and linear actuator 104, both of which utilize mechanical advantages to reduce the forces required to effectuate their purposes. For example, the linear actuator 104 utilizes the lever 112 to provide a mechanical advantage as it raises and lowers the upper conveyor assembly 88. As for the dispensing motor 40, it utilizes mechanical advantages gained by the size, shape, and positioning of the dispensing drum 52. As the dispensing drum 52 rotates, the packaged good 140 is essentially lowered onto the common conveyor 302. As a result of these design features, the dispensing motor 40 and linear actuator 104 are smaller, less expensive, and more energy efficient. The energy efficiencies of these components allows the novel modular vending machine for packaged goods 200 to operate on standard 110 V AC electrical power.

Another advantage of the invention is that it imparts minimal disturbance and agitation to the packaged goods 140 thereby minimizing the likelihood of damage to the product. The packaged good 140 that is located on the dispensing drum 52 is placed onto the common conveyor 302 by the rotation of the dispensing drum 52. This rotational movement allows the packaged good 140 to be placed on the common conveyor 302 with minimal agitation. The packaged goods 140 that remain in storage on the lower conveyor assembly 82 (or upper conveyor assembly 88) shift into position by the force of gravity. The rate of movement of these items is controlled by limiting the angle of inclination of the lower conveyor assembly 82 and upper conveyor assembly 88.

Yet another advantage of the invention is that it is easy for an individual to reload the somewhat bulky and heavy packaged goods. The posterior end of the invention is designed to provide unobstructed access to the lower conveyor assembly 82 and upper conveyor assembly 88. Although the lift heights required to reload these conveyor assemblies may vary based upon application, it is anticipated that the maximum lift height will be approximately five and a half feet.

The invention is also advantageous because it utilizes a reduced number of moving parts, thereby reducing the likelihood of component failure that could cause a packaged good 140 to become jammed. The components that are most likely to need service are positioned in locations that allow easy access for repair, maintenance, or replacement. For example, the dispensing motor 40 is located at the lower posterior end of the cabinet 20. The dispensing motor 40 may be removed by relieving the tension on the drive chain 44 and detaching the dispensing motor 40 from the base 26. Similarly, the electronic controls such as the smart relay 32, the first relay 34, and the second relay 36 are assembled in a modular fashion. This modular arrangement allows for simultaneous replacement of all of these components in the field, thereby minimizing operational down time if an electrical component malfunctions.

The invention is also versatile because it may be readily adaptable to accommodate various sizes of packaged goods 140. This versatility is attained by adjusting the position of the retainer plate 80 and reprogramming the counter of the smart relay 32. The position of the retainer plate 80 may be adjusted in the field. Likewise, the smart relay 32 may be reprogrammed in the field. Although these and other advantages may be present, the invention does not require that all the advantageous features and all the advantages need to be incorporated into every embodiment of the invention.

While the invention has been described with respect to a limited number of embodiments, those skilled in the art will appreciate numerous modifications and variations therefrom. It is intended that the appended claims cover all such modifications and variations as fall within the true spirit and scope of the invention. Any element in a claim that does not explicitly state "means for" performing a specified function is not to be interpreted as a "means" clause as specified in 35 U.S.C. §112, ¶6.

We claim:

1. An apparatus for vending packaged goods, the apparatus comprising:

(a) a cabinet;

(b) a lower conveyor assembly, comprised of a plurality of parallelly disposed rollers, an attachment rod, and a roller frame, disposed at an incline within the cabinet, for storing and conveying a plurality of goods packaged in boxes;

(c) an upper conveyor assembly, comprised of a plurality of parallely disposed rollers, an attachment rod, and a roller frame, positioned over the lower conveyor assembly and having a posterior end and an anterior end, disposed at an incline within the cabinet, for storing and conveying a plurality of goods packaged in boxes and having the posterior end pivotally attached to the cabinet so that the anterior end of the upper conveyor assembly is vertically displaceable;

(d) a lift assembly, comprised of a linear actuator, a first pivot bearing, a second pivot bearing, a linear actuator mounting bracket, a lever, a first lift bar, a second lift bar, upper guide slots, and lower guide slots, for vertically displacing the anterior end of the upper conveyor assembly loaded with a plurality of goods packaged in boxes;

(e) an adjustable retainer plate having a generally rectangular shape and being located within the cabinet and positioned proximal to the anterior end of the upper conveyor assembly;

(f) a dispensing drum that is generally cylindrical shaped having a notched recess that extends longitudinally for the length of the dispensing drum, said notched recess comprised of two planar surfaces configured for dispensing the goods packaged in boxes from the lower conveyor assembly and upper conveyor assembly; and (g) a rotating means for rotating the dispensing drum a complete revolution.

2. The apparatus for vending packaged goods of claim 1 further comprising an automated control system having a programmable logic device, a photoelectric eye transmitter and receiver, a proximity sensor, an adjustably mounted proximity sensor indicator, a reset button, and a plurality of relays.

3. The apparatus for vending packaged goods of claim 1 wherein the packaged goods are displaceable over the upper conveyor assembly and the lower conveyor assembly by gravity only.

4. The apparatus for vending packaged goods of claim 1, wherein the lift assemblies comprise a winch, pulleys, and cables.

5. The apparatus for vending packaged goods of claim 1, wherein the rotating means comprises a dispensing motor, a drive chain, and an adjustable idler.

6. The apparatus for vending packaged goods of claim 1, wherein the rotating means comprises a dispensing motor, a belt, and an adjustable idler.

7. A system of apparatuses for vending package goods of claim 1, wherein the apparatuses are arranged to dispense goods packaged in boxes onto a common conveyor that transports the goods packaged in boxes to a dispensing bin, with the apparatuses electronically connected to a single user interface.

8. The apparatus for vending packaged goods of claim 1, wherein the rotating means comprises an electric dispensing motor operating at speeds variable between 7.7 and 9.3 rpm, producing $\frac{1}{13}$ hp, and having a 180:1 gear ratio.

* * * * *